United States Patent [19]

Butler et al.

[11] Patent Number: 5,895,510
[45] Date of Patent: Apr. 20, 1999

[54] AIR FILTER ASSEMBLY

[75] Inventors: Patrick G. Butler, Oklahoma City; Burt O. Browning, Edmond; Wesley B. Garner, Noble; Paul A. Rogers, Vinita; Timothy J. Winkeler, Oklahoma City, all of Okla.

[73] Assignee: Dana Corporation, Toledo, Ohio

[21] Appl. No.: 08/955,767

[22] Filed: Oct. 22, 1997

[51] Int. Cl.⁶ .................................................. B01D 50/00
[52] U.S. Cl. ........................... 55/490; 55/495; 55/497; 55/502; 55/508; 55/510
[58] Field of Search ............................ 55/490, 491, 495, 55/497, 498, 502, 508, 510, 337

[56] References Cited

U.S. PATENT DOCUMENTS

| | | |
|---|---|---|
| 2,954,096 | 9/1960 | McMullen . |
| 3,535,853 | 10/1970 | Brown et al. ........................ 55/508 |
| 3,546,853 | 12/1970 | Claar ................................... 55/510 |
| 4,243,397 | 1/1981 | Tokar et al. . |
| 4,314,832 | 2/1982 | Fox ...................................... 55/510 |
| 4,663,041 | 5/1987 | Miyagi et al. ....................... 55/502 |
| 4,726,825 | 2/1988 | Natale ................................. 55/508 |
| 4,890,444 | 1/1990 | Giessen et al. ..................... 55/510 |
| 5,066,318 | 11/1991 | McDonough . |
| 5,207,812 | 5/1993 | Tronto et al. ....................... 55/498 |
| 5,211,846 | 5/1993 | Kott et al. . |
| 5,409,512 | 4/1995 | Wilkerson et al. . |

*Primary Examiner*—Jay H. Woo
*Assistant Examiner*—Minh-Chau T. Pham
*Attorney, Agent, or Firm*—Millen, White, Zelano, & Branigan, P.C.

[57] ABSTRACT

In an air filter assembly a non-metallic air filter media is clamped between a pair of opposed metal end flanges, one of which is mounted by a threaded mounting rod in alignment with an opening through a horizontal panel. A metal sleeve integral with one of the end flanges stiffens the assembly and prevents the filter media from collapsing. The air filter assembly is used with numerous similar air filter assemblies to filter inlet combustion air for large gas turbine engines.

14 Claims, 3 Drawing Sheets

AIR FILTER ASSEMBLY

FIELD OF THE INVENTION

The present invention relates to air filter assemblies. More particularly, the present invention relates to a configuration for an air filter assembly wherein the assembly is utilized together with other similar air filter assemblies for filtering air utilized, for example, as combustion air for a large internal combustion engine such as a gas turbine engine.

BACKGROUND OF THE INVENTION

Gas turbine engines used to drive generators for generating electric power provided by utility companies and other large concerns require large amounts of combustion air. Since these turbines are installed near or at ground level, it is necessary to filter the combustion air because ground level air is ladened with particulate matter that will damage a turbine engine if ingested.

In order to remove particulate matter from combustion air, it is the practice to provide an air inlet enclosure which is partitioned into a dirty or upstream air chamber and a clean or downstream air chamber. The partition is in the form of a horizontal panel having air intake openings therethrough. Aligned with each air intake opening is an individual air filter. According to the present practice, each filter includes a filter media sandwiched in a cage of expanded metal. Eventually, the filter media becomes clogged with airborne particles. When this happens, the filter media must be replaced in order to maintain the efficiency of the gas turbine using the filtered combustion air. Each enclosure contains many air filters. For example, in one installation, there are 864 separate air filters spaced two feet apart. Since air filters with expanded metal cages are relatively expensive and because there are numerous air filters for each location, replacement costs are relatively high. Moreover, due to the millions of air filter elements for vehicles which are replaced and disposed of each year, disposing of air filters has become an environmental issue with respect to any type of air filter. Since new regulations now make it difficult to dispose of air filters with metal components, there is a need for air filter arrangements, used with large gas turbines, which do not require filter media with metallic components.

SUMMARY OF THE INVENTION

The present invention is directed to an air filter assembly having a readily replaceable, non-metallic filter media, wherein the non-metallic filter media is releasably held in alignment with an inlet opening in a panel by an assembly which includes first and second end flanges engaging first and second ends of the filter media to hold the filter media in alignment with the opening. In order to stiffen the assembly, a sleeve, integral with one of the end flanges, extends through the hollow core of the filter media.

In accordance with another aspect of the invention, there are a plurality of the aforedescribed non-metallic filter media adapted to be held in alignment with a plurality of openings through the panel for filtering a volume of air which is used, for example, as intake combustion air for an engine, such as a gas turbine engine.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
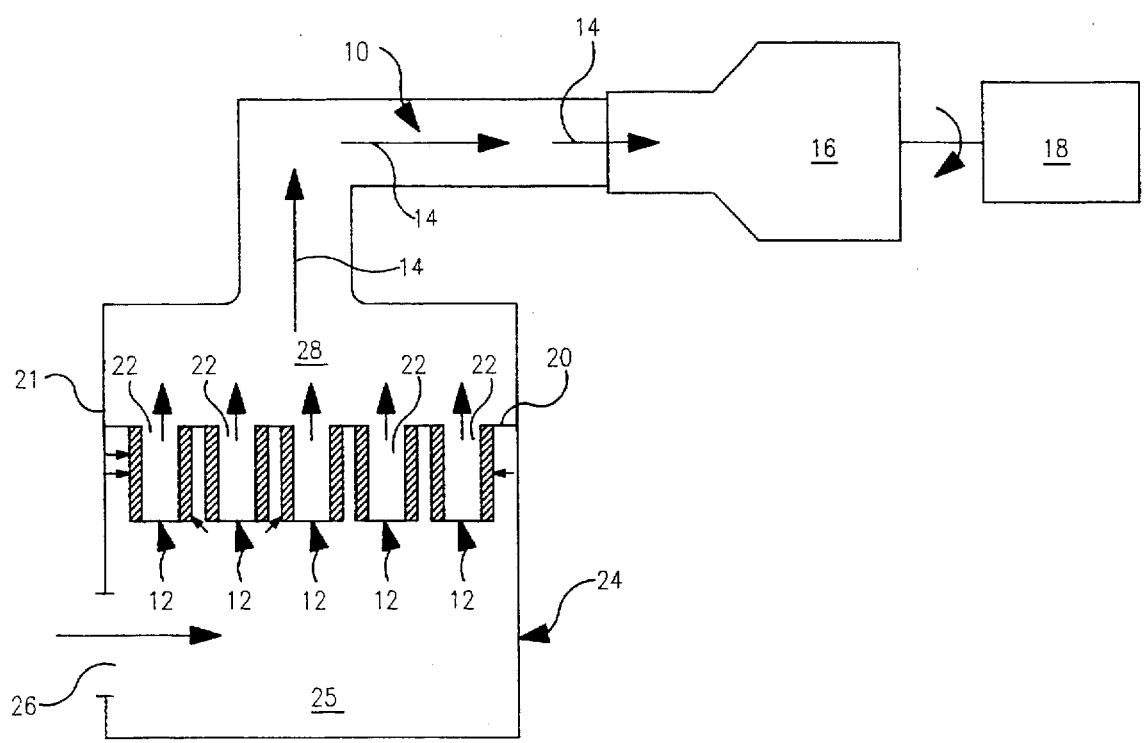
FIG. 1 is a side schematic view showing a plurality of filter assemblies configured in accordance with the present invention for filtering air used by an engine, such as an internal combustion engine, for example a gas turbine engine.

Referring now to FIG. 1, there is shown a system 10 which utilizes a plurality of air filter assemblies 12, configured in accordance with the principles of the present invention, to filter an air stream 14 that provides combustion air for a gas turbine engine 16 that drives a generator 18. In a typical installation, there are many filter assemblies 12, for example, in one installation there are 864 filter assemblies 12 spaced 2 ft. apart on a horizontal panel 20 having openings 22 therethrough, with which openings the filter assemblies 12 are aligned. The horizontal panel 20 forms a ceiling of an enclosure 24 and divides the enclosure into an upstream chamber 25 having an opening 26 to the environment and a downstream chamber 28 which receives clean filtered air which has been filtered by the filter assemblies 12 to remove particulate matter therefrom.

Figure 2:
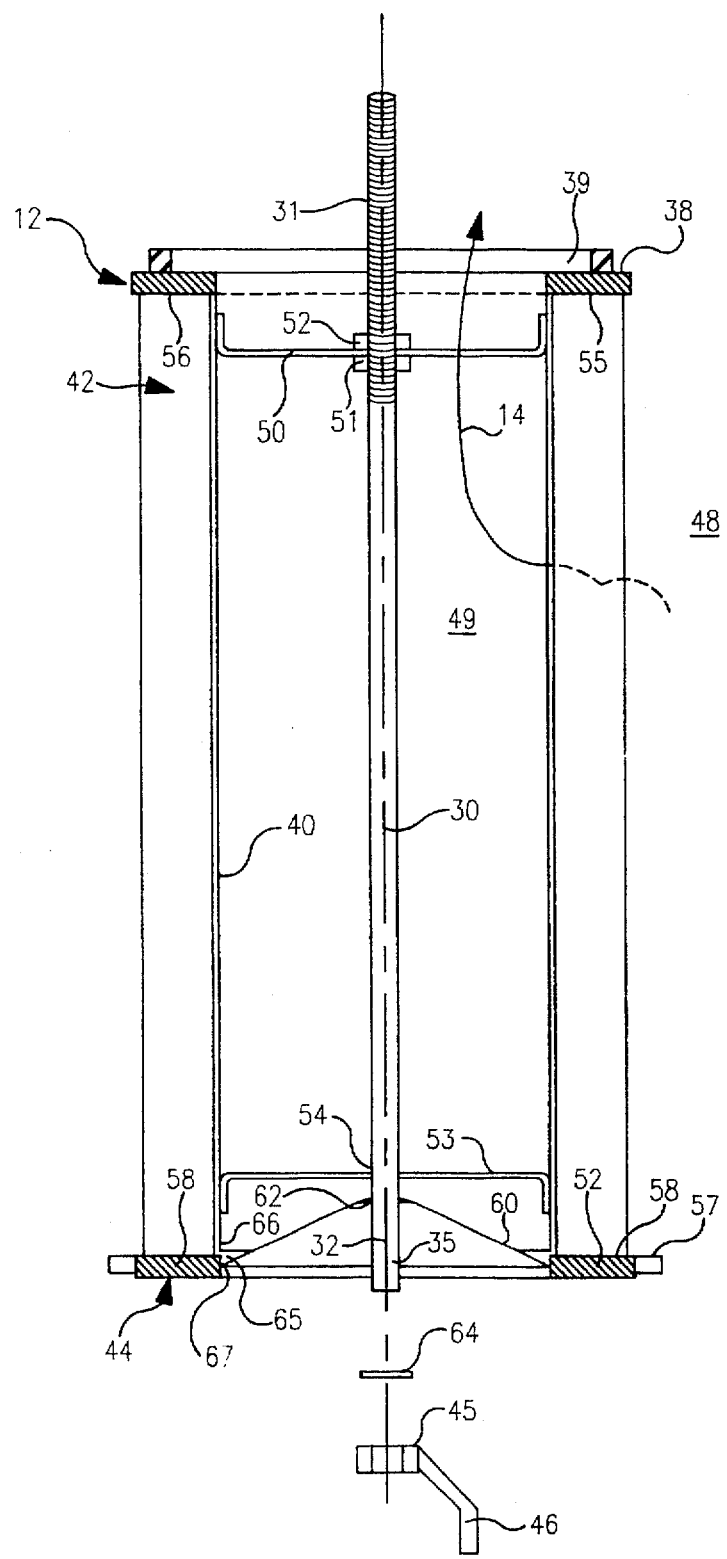
FIG. 2 is a side elevation of one of the filter assemblies shown in FIG. 1.
Figure 3:
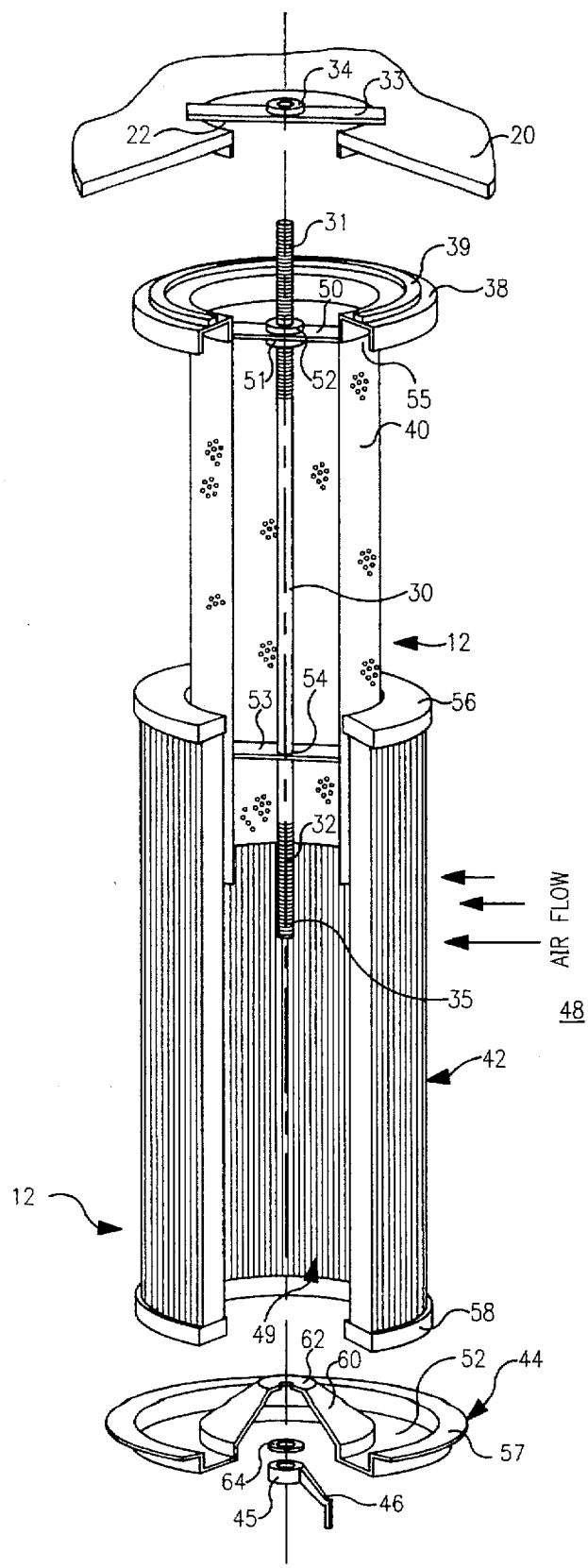
FIG. 3 is an exploded view of the filter assembly of FIG. 2.

Referring now to FIG. 2 and 3, there is shown a first embodiment of the filter assembly 12 configured in accordance with the present invention mounted in alignment with one of the openings 22 in the horizontal panel or ceiling 20. The filter assembly 12 is supported by mounting a rod 30 which has a first end portion 31 and a second end portion 32. The first and second end portions 31 and 32 of the rod 30 are threaded. Positioned within the circular opening 22 is a bracket 33 (see FIG. 3) having an internally threaded nut 34 welded or otherwise fixed thereto. The first threaded end 31 of the rod 30 threads into the nut 34 to hold the filter assembly 12 in alignment and beneath the hole opening 22. A flat 35 at the second end portion 32 of the rod 30 facilitates turning the rod with a wrench.

The rod 30 cooperates with a first metal end flange 38 having a gasket 39 that compresses against and seals with the horizontal panel 20. Depending from the first end flange 38 is a perforated metal sleeve 40 which is integral therewith and holds an annular, non-metallic filter media 42 in alignment with the circular opening 22 in the panel 20 by clamping the filter media 42 between the first end flange 38 and a second metal end flange 44. The clamp is effected by a nut 45 having axially depending finger tab 46.

The filter media 42 is preferably a pleated paper filter media which is not necessarily stiff enough to withstand the pressure differential between the area 48 external to the filter media and a hollow core 49 of the filter 42. Accordingly, the annular filter media 42 is mounted over the perforated metal sleeve 40 depending from the first end flange in order to stiffen the filter media 42 to keep the filter media from collapsing.

The first end flange 38 has an internal bracket 50 extending thereacross which includes an internally threaded nut 51 fixed thereto, through which nut the threaded end 31 of the rod 30 is threadably received. A second internally threaded nut 52 fixes the rod 30 axially with respect to the first end flange 38 when tightened against the bracket 50. This allows the rod 30 to support the first end flange 38 and its depending perforated sleeve 40 independently of the annular filter media 42 and second end flange 44. In order to keep the rod 30 centered, a second bracket 53 is positioned within the sleeve 40. The second bracket 53 has a hole 54 therethrough which receives the rod 30. Consequently, the annular air filter media 42 can be periodically replaced, or replaced whenever clogged, while the first end flange 38 and depending perforated sleeve 40 are retained in place against the horizontal panel 20. As a result, all of the metallic components of the filter assembly 12 remain at the filtering site and only the non-metallic, annular filter media 42 is disposed of.

In order to firmly seat the non-metallic annular filter media 42, the first end flange 38 has a U-shaped channel 55 therein while the second end flange 44 has a U-shaped channel 56 therein. The U-shaped channels 55 and 56 receive plastisol end caps 57 and 58 on first and second ends, respectively of the non-metallic annular filter media 42 (which is preferably made of pleated paper).

The U-shaped channel 56 is surrounded by a radially projecting peripheral flange 59 and has a central frustoconical projection 60. The flange 59 and projection 60 cooperate to facilitate seating of the second end cap 58 in the U-shaped channel 56. The frustoconical projection 60 has a flat interior end 62 against which the nut 45 presses with the washer 64.

When the nut 45 is tightened, the second end flange 44 presses against the second plastisol end cap 54 which in turn presses the first plastisol end cap 56 against the first end flange 38. As is seen in FIG. 2 the perforated sleeve 40 is slightly shorter than the filter media 42 so that there is a gap 65 between the free end 66 of the perforated sleeve and the interior 67 of the second end flange 44. This allows for a slight axial compression of the filter media 42, which compression provides a sufficient seal between the end cap 56 and 58 and the end flanges 38 and 44 while reliably securing the filter media in alignment with the opening 22.

In order to convert from the prior art arrangement to the present arrangement, the prior art filter assemblies are removed entirely and the first end flanges 38 with the depending 40 sleeves of the filter assemblies 12 are mounted in alignment with the openings 22 by screwing the threaded ends 31 of the rods into the fixed nuts 34. This is accomplished by either gripping the sleeves 40 and rotating the sleeves or gripping the rods which are axially fixed to the first end flanges by the nuts 52. The filter media 42 are then mounted over the sleeves 40 as has been described heretofore.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An air filter assembly for filtering air entering an inlet opening in a panel, the air filter comprising:
    a first end flange having a U-shaped channel portion and an integral cylindrical sleeve portion wherein the integral cylindrical sleeve portion has openings therethrough for the passage of air, the first end flange and integral cylindrical sleeve portion forming a unit;
    a second end flange having a U-shaped channel portion and a central hub portion;
    a mounting rod extending within the air filter, the mounting rod having a first end and a second end, the first end adapted to be attached to the panel at the location proximate the first end flange and the second end being received through the second end flange;
    an annular cylindrical filter media having a hollow core and first and second ends, the media being made of a non-metallic material and having annular non-metallic end caps on the first and second ends; and
    a fastener releasably retaining the second end flange on the mounting rod for holding the annular air filter media assembly assembled by having the first end cap of the filter media seated within the U-shaped channel portion of the first end flange; the second end cap of the filter media seated within the U-shaped channel portion of the second end flange, and the sleeve portion of the first end flange extending through the hollow core of the filter media and receiving the central hub portion therein; whereby upon releasing the fastener, the assembly is disassembled so that the filter media is replaceable.

2. The filter assembly of claim 1 further including a sealing gasket disposed between the first end flange and panel.

3. The filter assembly of claim 1 further including a bracket on the first end flange for holding the rod in a fixed axial position with respect to the first flange.

4. The filter assembly of claim 3 wherein the rod is threaded adjacent the first and second ends thereof and the fastener is a threaded fastener.

5. The filter assembly of claim 4 wherein the rod is held on the bracket by a threaded nut.

6. The filter assembly of claim 5 wherein the sleeve has a length less than that of filter media wherein when the fastener is advanced on the rod the filter media is compressed in an axial direction by the second end flange.

7. The filter assembly of claim 1 wherein the sleeve has a length less than that of the filter media wherein when the fastener retains the second end flange on the mounting rod the filter media is axially compressed.

8. An air filter arrangement comprising:
    a plurality of air filter assemblies each mounted in alignment with an air inlet opening in a panel dividing an enclosure into an upstream chamber and a downstream chamber, wherein air filtered by the air filter assemblies is used in a downstream device, and wherein each air filter assembly comprises:
    a first end flange having a U-shaped channel portion and an integral sleeve portion wherein the integral sleeve portion has openings therethrough for the passage of air;
    a second end flange having a U-shaped channel portion and a central hub portion;
    a mounting rod extending within the air filter, the mounting rod having a first end and a second end, the first end adapted to be attached to the panel at the location proximate the first end flange and the second end being received through the second end flange;
    an annular filter media having a hollow core and first and second ends, the media being made of a non-metallic material and having annular non-metallic end caps on the first and second ends; and
    a fastener releasably retaining the second end flange on the mounting rod for holding the annular air filter media assembly assembled by having the first end cap of the filter media seated within the U-shaped channel portion of the first end flange; the second end cap of the filter media seated within the U-shaped channel portion of the second end flange, and the sleeve portion of the first end flange extending through the hollow core of the filter media;

whereby upon releasing the fastener, the assembly is disassembled so that the filter media is replaceable.

9. The air filter arrangement of claim 8 wherein the plurality of air filter assemblies further include for each assembly a sealing gasket disposed between the first end flange and panel.

10. The air filter arrangement of claim 9 wherein the plurality of air filter assemblies further include a bracket on the first end flange of each assembly for holding the rod in a fixed axial position with respect to the first flange.

11. The air filter arrangement of claim 10 wherein the plurality of air filter assemblies wherein in each assembly the rod is threaded adjacent the first and second ends thereof and the fastener is a threaded fastener.

12. The air filter arrangement of claim 11 wherein in each assembly the rod is held on the bracket by a threaded nut.

13. The air filter arrangement of claim 12 wherein in each assembly the sleeve has a length less than that of filter media wherein when the fastener is advanced on the rod the filter media is compressed in an axial direction by the second end flange.

14. The air filter arrangement of claim 9 wherein the device is an internal combustion engine, such as a gas turbine engine.

* * * * *